United States Patent [19]
Kenmochi

[11] Patent Number: 5,854,830
[45] Date of Patent: Dec. 29, 1998

[54] CONCURRENT VOICE AND DATA COMMUNICATION

[75] Inventor: Toshio Kenmochi, Yokohama, Japan

[73] Assignee: Canon Kabushiki Kaisha, Tokyo, Japan

[21] Appl. No.: 985,239

[22] Filed: Dec. 4, 1997

Related U.S. Application Data

[63] Continuation of Ser. No. 458,843, Jun. 2, 1995, abandoned.

[30] Foreign Application Priority Data

Jun. 3, 1994 [JP] Japan .................................. 6-145701

[51] Int. Cl.⁶ .................................................. H04M 11/00
[52] U.S. Cl. .................................. 379/100.15; 379/93.09; 358/442
[58] Field of Search ........................ 379/100.01, 100.12, 379/100.15–100.17, 93.01, 93.05–93.11; 358/425, 434–436, 438–440, 442, 468; 348/14–19

[56] References Cited

U.S. PATENT DOCUMENTS

| | | | |
|---|---|---|---|
| 3,875,339 | 4/1975 | Gruen et al. | 370/493 |
| 4,546,212 | 10/1985 | Crowder et al. | 370/493 |
| 4,596,021 | 6/1986 | Carter et al. | 379/98 |
| 4,757,495 | 7/1988 | Decker et al. | 370/493 |
| 4,785,355 | 11/1988 | Matsumoto . | |
| 4,809,271 | 2/1989 | Kondo et al. | 370/535 |
| 4,825,461 | 4/1989 | Kurita et al. | 379/93 |
| 5,063,587 | 11/1991 | Semasa et al. | 379/96 |
| 5,164,980 | 11/1992 | Bush et al. | 348/17 |
| 5,214,650 | 5/1993 | Renner et al. | 379/93 |
| 5,297,146 | 3/1994 | Ogawa | 379/96 |
| 5,359,644 | 10/1994 | Tanaka et al. | 379/96 |
| 5,452,289 | 9/1995 | Sharma et al. | 379/93 |

FOREIGN PATENT DOCUMENTS

5-75756  3/1993  Japan .

*Primary Examiner*—Wing F. Chan
*Attorney, Agent, or Firm*—Fitzpatrick, Cella, Harper & Scinto

[57] ABSTRACT

A communication apparatus is provided which is capable of facsimile communication, voice communication and concurrent voice/facsimile communication. In one version, the apparatus has first and second connecting units for connection to a voice communication terminal (such as a conventional telephone) and a data communication terminal (a facsimile apparatus or the like), respectively. A selector selects between those two connecting units. An analog signal from either the voice communication terminal or the data communication terminal is binarized, the two streams of data (if the apparatus is in concurrent transmission mode) are mixed, and the resulting data stream is converted to an analog signal for transmission. Similarly, an incoming analog signal, if received in the concurrent communication mode, is separated into binary voice and binary non-voice data, which are then separately processed and output as appropriate. Also, it is possible to switch among voice, data, and concurrent voice/data modes.

43 Claims, 12 Drawing Sheets

| | SW1 | SW2 | SW3 | SW4 |
|---|---|---|---|---|
| FAX/VOICE CONCURRENT COMMUNICATION MODE (MODE 1) | ON | OFF | ON | ON |
| VOICE MODE (MODE 2) | OFF | OFF | OFF | OFF |
| FACSIMILE COMMUNICATION MODE (MODE 3) | OFF | ON | OFF | OFF |

FIG. 6

| VOICE | VOICE | FLAG | VOICE | VOICE | DIS1 | VOICE | VOICE | DIS2 |
|---|---|---|---|---|---|---|---|---|

FIG. 7

| VOICE | VOICE | all 1 | VOICE | VOICE | all 1 | VOICE | VOICE | PIX |
| VOICE | PIX | | VOICE | PIX | | VOICE | VOICE | PIX |

FIG. 8

| VOICE | VOICE | all 1 | VOICE | VOICE | all 1 | VOICE | VOICE | FLAG |

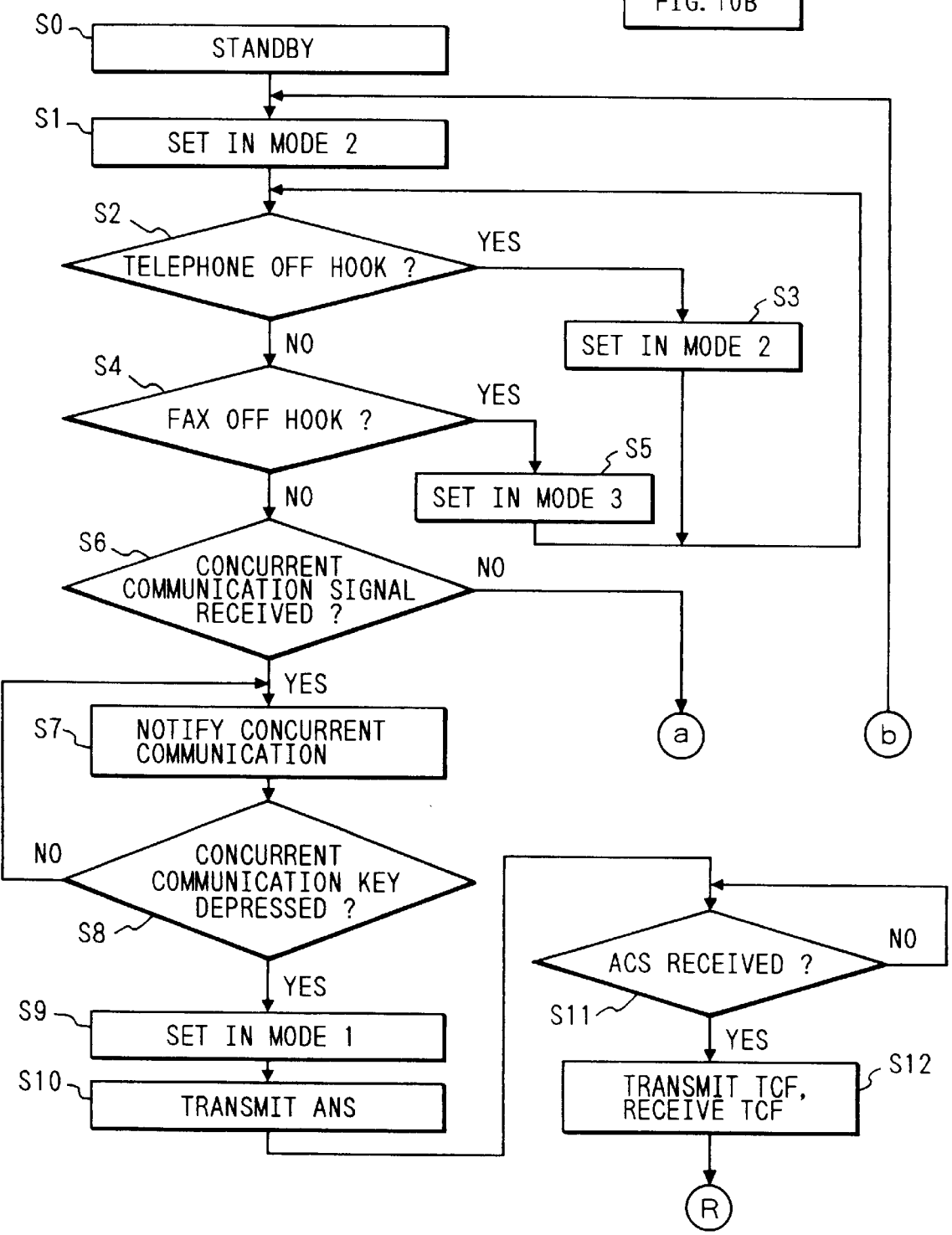

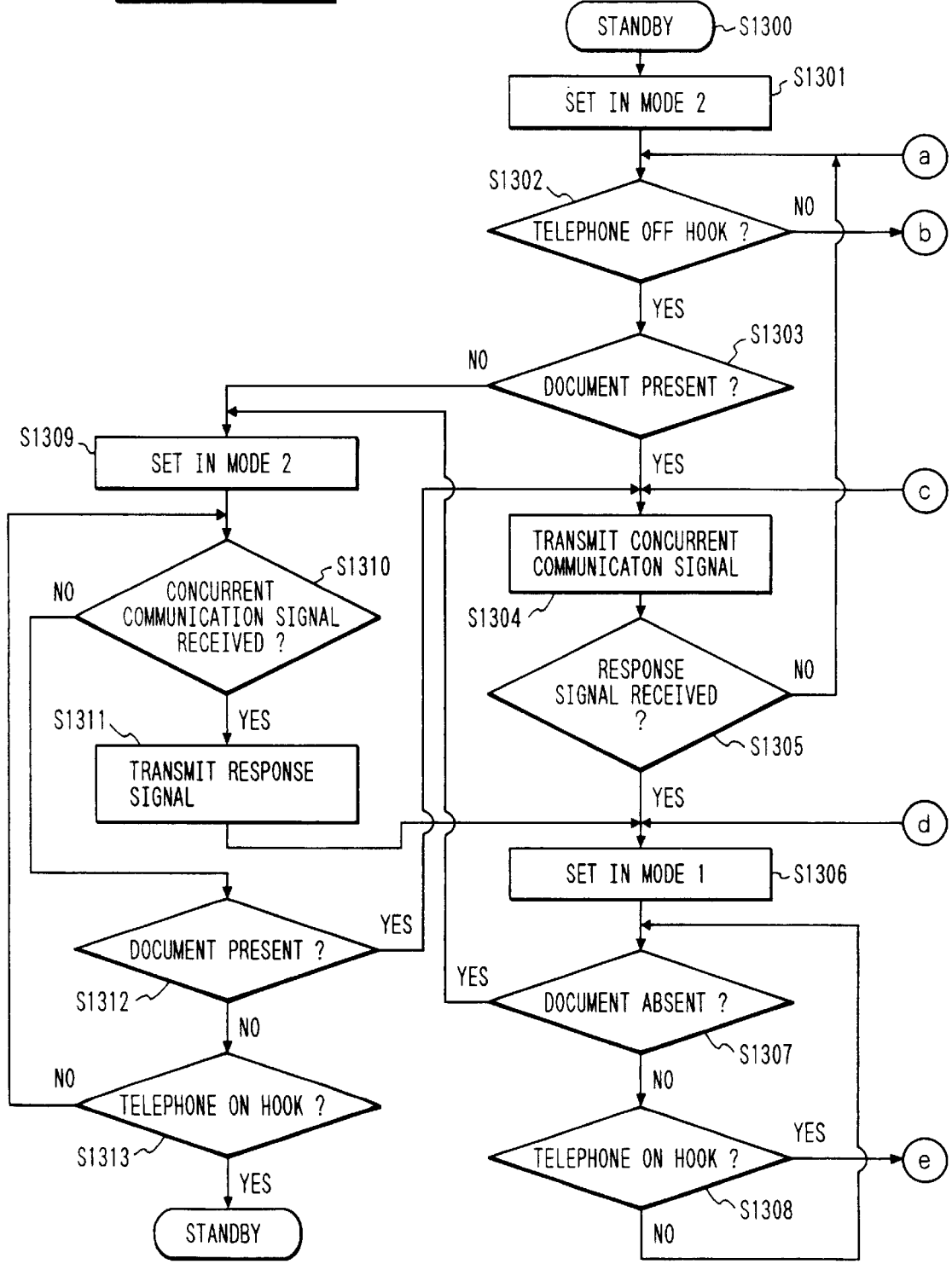

CONCURRENT VOICE AND DATA COMMUNICATION

This application is a continuation of Ser. No. 08/458,843, filed Jun. 2, 1995.

BACKGROUND OF THE INVENTION

1. Field of the Invention

The present invention relates to a communicating apparatus which can concurrently communicate voice data and data other than the voice data.

2. Related Background Art

Hitherto, as an apparatus which can concurrently communicate, for example, facsimile data and voice data, a communicating apparatus which can concurrently execute a facsimile communication and a speech communication by one apparatus by assembling a facsimile function and a telephone function in the apparatus main body has been proposed. U.S. Pat. Nos. 4,785,355 and 4,825,461 relate to such apparatus.

With such a communicating apparatus, however, existing types of facsimile apparatus or telephone cannot be used, so that these is a problem in that an apparatus which has been used hitherto is no longer of use.

An apparatus which concurrently communicates facsimile data and voice data by using one line is also proposed in Japanese Laid-Open Patent Application No. 5-75756.

In that apparatus, however, during the concurrent communication of a facsimile communication and a voice communication, even when one of those communications is finished, the apparatus cannot be switched to purely-facsimile or purely-voice communication.

SUMMARY OF THE INVENTION

It is an object of the invention to provide a communicating apparatus which can apparatus which can concurrently perform a voice communication and data communication by using the existing facsimile apparatus or telephone.

It is another object of the invention to provide a communicating apparatus which can select between concurrent voice and data communication, voice communication, and data communication.

Further, another object of the invention is to provide a communicating apparatus which can automatically switch among concurrent voice and data communication, voice communication, and data communication.

The above and other objects and features of the present invention will become apparent from the following detailed description and the appended claims with reference to the accompanying drawings.

BRIEF DESCRIPTION OF THE DRAWINGS

FIG. 6 shows a format for transmitting and receiving voices and data of the invention;

FIG. 7 shows a format for transmitting and receiving voices and data of the invention;

FIG. 8 shows a format for transmitting and receiving voices and data of the invention;

DETAILED DESCRIPTION OF THE PREFERRED EMBODIMENTS

Figure 1:
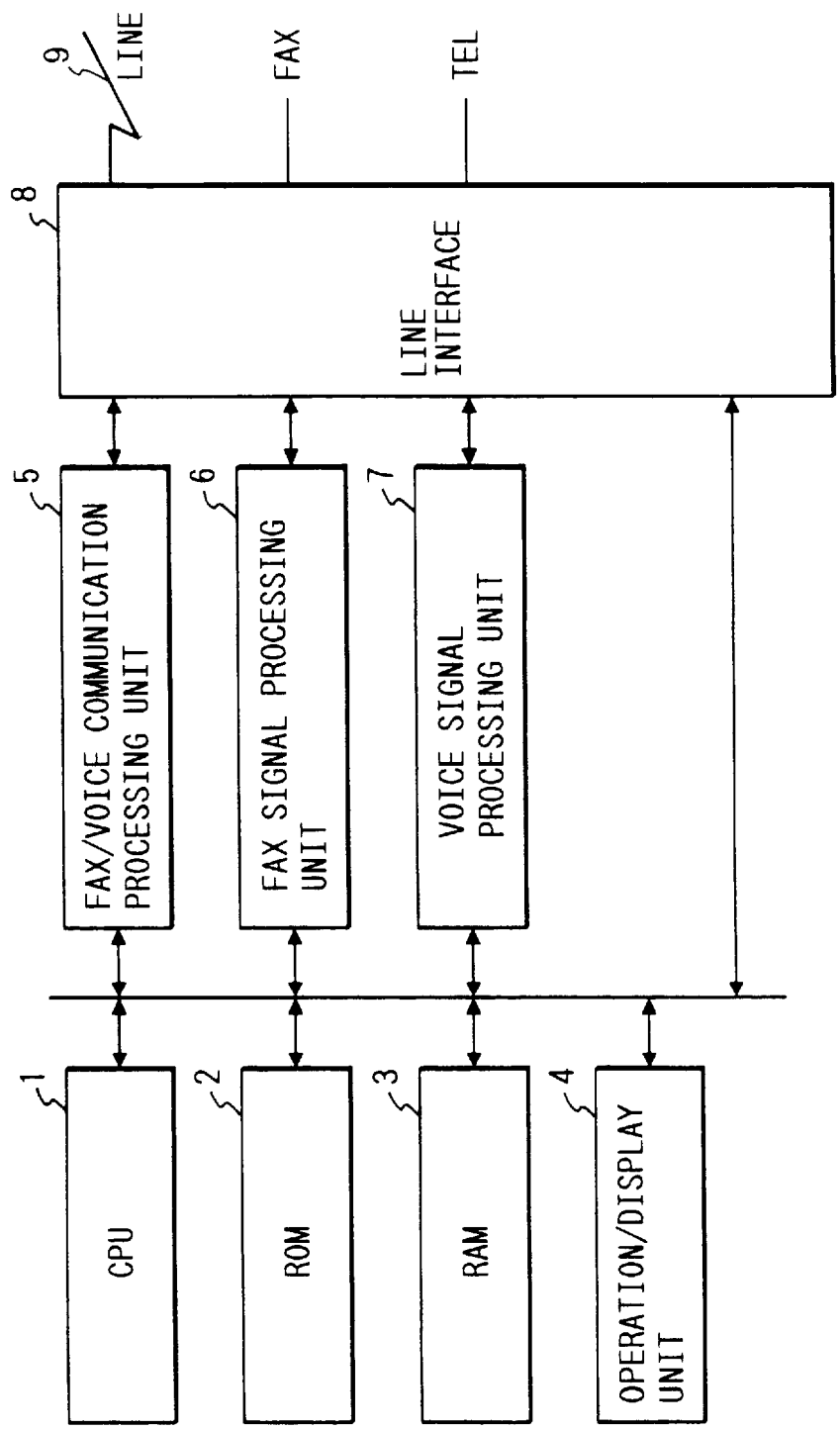
FIG. 1 is a block diagram showing a construction of a communicating apparatus of the invention.

FIG. 1 is a block diagram showing a construction of a communicating apparatus according to the first is embodiment of the invention.

A CPU 1 controls the whole apparatus, namely, RAM 3, an operation/display unit 4, an FAX/voice communication processing unit 5, an FAX signal processing unit 6, a voice signal processing unit 7, and a line interface unit 8, in accordance with a program stored in an ROM 2.

The RAM 3 is used to temporarily store input/output data to/from the FAX/voice communication processing unit 5, FAX signal processing unit 6, and voice signal processing unit 7, to store data necessary to process in the CPU 1, and the like.

The operation/display unit 4 has various keys, such as key to select whether a concurrent communication of FAX/voice is executed or not and the like, and a display showing operating states of the keys.

Figures 2, 4:
FIG. 2 shows a format for transmitting and receiving voices and data of the invention.
FIG. 4 is a table showing the relation between the ON/OFF states of switches in the line interface and the operating modes of the communicating apparatus in the invention.

The FAX/voice communication processing unit 5 comprises a modem for modulating and demodulating data corresponding to V.17 and transmits and receives voices and data in a format shown in FIG. 2 with another communicating apparatus having a construction similar to that of the present apparatus through the line interface unit 8 and a line 9.

FIG. 2 will now be described. In FIG. 2, one block denotes one byte unit. Voice data is constructed by two bytes, while image data is constructed by one byte. That is, the modem of V.17 is a modem which can execute a full duplex communication of 14.4 kbps. 9.6 kbps in 14.4 kpbs data is used for communication of the voice data, and 4.8 kbps is used for communication of the image data.

The transmission side modulates the voice data and image data stored in the RAM 3 in accordance with this order and transmits to the line 9. The reception side demodulates the received data and stores into the RAM 3 in accordance with that order.

While performing a facsimile communication according to T.30 by the ITU-T recommendation with a facsimile apparatus connected to the line interface unit 8 by a command from the CPU 1, the FAX signal processing unit 6 converts information from the facsimile apparatus to a digital signal and stores into a data buffer for facsimile in the RAM 3. On the contrary, the FAX signal processing unit 6 decodes the data stored in the data buffer for facsimile in the RAM 3, converts it to an analog facsimile signal, and communicates with the facsimile apparatus through the line interface unit 8. Thus, the facsimile communication can be performed concurrently with the voice communication by connecting an existing facsimile apparatus to the present communicating apparatus.

The voice signal processing unit 7 encodes the analog signal from the telephone connected to the line interface unit 8 using VSELP coding (Vector-Sum Excited Linear Predictive Coding) as one example for the coding methods of the voice signal and stores the encoded data to a date buffer for voice data in the RAM 3. The voice signal processing unit 7 decodes the voice data stored in the buffer for voice data in the RAM 3 and transmits to the telephone through the line interface unit 8 as an analog signal. Thus, the voice communication can be performed concurrently with the facsimile communication by connecting in existing telephone to the communicating apparatus.

Figure 3:
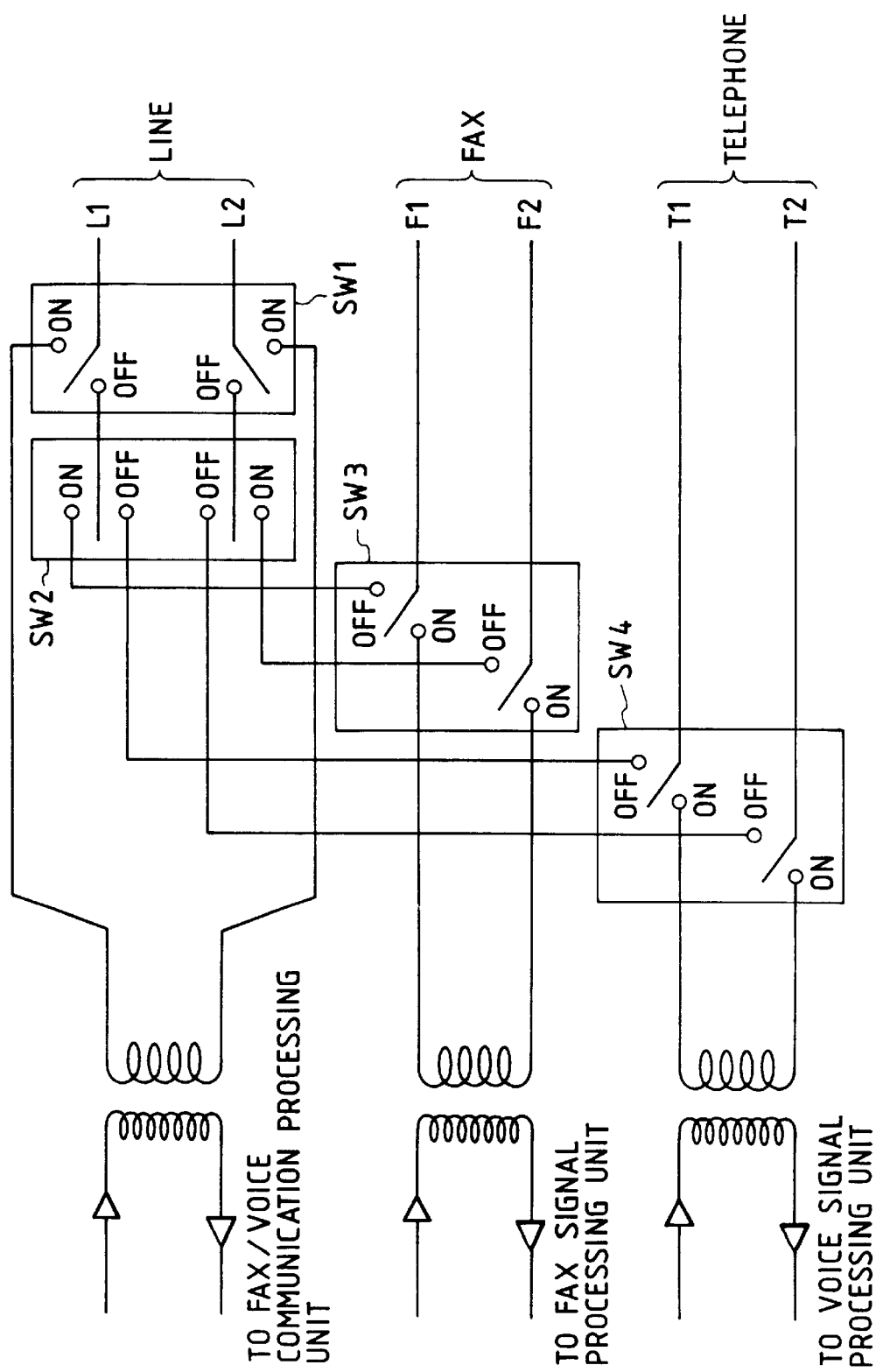
FIG. 3 is a constructional diagram of a line interface unit of the invention.

The telephone line 9, facsimile apparatus, and telephone can be connected to the line interface unit 8 as mentioned above. Specifically, the line interface unit 8 is constructed as shown in FIG. 3. In FIG. 3, SW1 denotes a switch for switching the connection of the line 9 to either one of the FAX/voice communication processing unit 5 and the externally attached facsimile apparatus/telephone. SW2 denotes a switch for switching the connection of the line 9 to either one of the facsimile apparatus and the telephone in the case where the line 9 is connected to the externally attached facsimile apparatus/telephone by the switch SW1.

SW3 indicates a switch for switching the connection of the externally attached facsimile apparatus to either one of the line 9 switched by the switch SW2 and an input/output to/from the FAX signal processing unit 6. SW4 denotes a switch for switching the connection of the externally attached telephone to either one of the line 9 switched by the switch SW2 and the input/output to/from the voice signal processing unit 7 in a manner similar to the case of the switch SW3.

FIG. 4 shows a table for explaining the relation of the ON/OFF states of each of the above-mentioned switches and the operating modes of the present apparatus.

Figure 5:
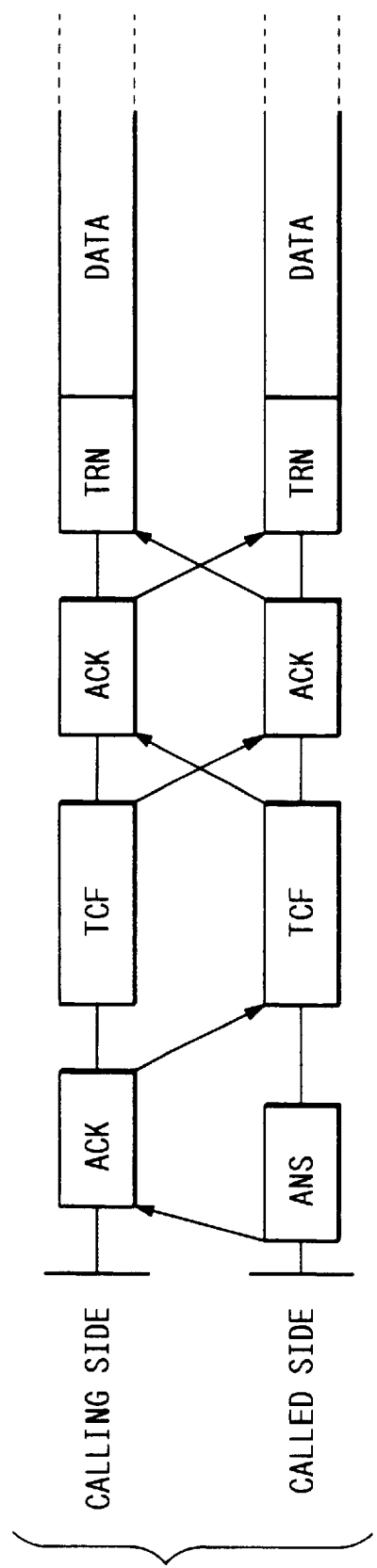
FIG. 5 is a diagram showing a communicating procedure of the communicating apparatus of the invention.

The operation of the embodiment will now be described with reference to FIG. 5 in accordance with flowcharts of FIGS. 10A and 10B to 12.

First, in a standby state in step S0, all of the initializing operations of the apparatus are executed. When the initialization is finished in step S0, the line interface unit 8 is set to the voice mode (mode 2) in FIG. 4. Mode 2 is a mode for performing an ordinary interactive communicating operation by the telephone connected to the line interface unit 8, and such an operation is executed as an initializing set of the line interface unit 8.

The off-hook or on-hook state of the telephone is detected in step S2. In the case of off-hook, the line interface unit 8 is set to mode 2 in step S3. In such a state, the line 9 is connected to the externally attached telephone.

The off-hook or on-hook state of the facsimile apparatus connected to the line interface unit 8 is detected in step S4. In the case of off-hook, the line interface unit 8 is set to mode 3 in step S5. Mode 3 is a mode for performing the ordinary communication of facsimile and the line 9 is connected to the externally attached facsimile apparatus. In this instance, the facsimile has a priority of the off-hook. Even if the telephone is off-hooked, when the facsimile apparatus is off-hooked, the line 9 is connected to the facsimile apparatus. The priority of the off-hook can be alternatively given to the telephone.

In step S6, when a concurrent communication signal which exists in control data and requests the concurrent communication is received from the partner side, the request of the concurrent communication from the partner side is conveyed to the operator in step S7. When a concurrent communication key is depressed, the line interface unit 8 is set to an FAX/voice concurrent communication mode (mode 1) and a response signal for the concurrent communication request is transmitted in step S9. Mode 1 is a mode for connecting the line 9 to the FAX/voice communication processing unit 5 of the apparatus, for connecting the externally attached facsimile apparatus to the FAX signal processing unit 6, and for connecting the externally attached telephone to the voice signal processing unit 7. The apparatus operates in mode 2 or mode 3 until the concurrent communication key of the operation/display 4 of the apparatus is depressed.

When the concurrent communication key is depressed in step S13, a concurrent communication signal for requesting the concurrent communication is transmitted in step S14. When a response signal for the concurrent communication signal is received in step S15, the line interface unit 8 is set to the FAX/voice concurrent communication mode (mode 1) in step S16.

The communication of mode 1 is executed in accordance with a procedure shown in FIG. 5 as follows.

First, the reception side transmits an ANS signal (tone signal of 2500 Hz for 0.5 second) to the transmission side in step S10. On the contrary, when the ANS signal is received in step S17, the transmission side transmits an ACK signal (tone signal of 2300 Hz for 0.5 second) to the reception side in step S18.

Further, in step S19, while transmitting a TCF signal (data of all "1" of 14.4 kbps for one second continuously) to the reception side, the transmission side receives the TCF signal which is similarly sent from the reception side. When the ACK signal from the transmission side is received in step S11, the reception side executes an operation similar to that in step S19 on the transmission side in step S12.

Since the operations on the transmission side in steps S20 to S28 and the operations on the reception side in steps S31 to S39 are executed in substantially the same manner, only the operations on the transmission side will be described hereinbelow.

The transmission side receives the TCF signal from the reception side in step S20. When the error rate of the TCF signal is equal to or less than 10%, the TCF signal reception can be performed. The ACK signal is sent to a receiver in step S21, and a response from the reception side to the TCF signal transmitted from the transmission side is received.

When the error rate of the TCF signal is larger than 10% in step S20, a NACK signal (tone signal of 2700 Hz for 0.5 second) is transmitted to the receiver in step S26, it is judged that concurrent communication of the voice and facsimile data cannot be executed, an error and such judgement result are displayed on a display in step S28, the line interface unit 8 is set to mode 2, and the apparatus is returned to the standby state.

When the response signal received in step S22 is the ACK signal, the communication of 14.4 kbps is started in step S23. The high speed communication in step S23 is finished when the concurrent communication key of the operation/ display unit is continuously depressed for two seconds or more in step S24. The line interface unit 8 is set to mode 2 in step S25 and the apparatus is returned to the standby state.

When the response signal received in step S22 is not the ACK signal, a check is made to see if the response signal is the NACK signal or not in step S27. If it is the NACK signal, it is judged that the concurrent communication cannot be executed and the error is displayed and the apparatus is returned to the standby state.

The above-mentioned high speed data communication in step S23 will now be described with reference to FIGS. 6 to 9.

The whole high speed data communication is performed by the full duplex communication of 14.4 kbps. A voice signal from the telephone is converted to digital data of 9.6 kbps by the VSELP coding by the voice signal processing unit 7. The modulated data is transmitted to the partner side in a format shown in FIG. 2, 6, 7, or 8 from the FAX/voice communication processing unit 5.

On the contrary, on the reception side, the data transmitted in the format shown in FIG. 2, 6, 7, or 8 is demodulated by the FAX/voice communication processing unit 5, the demodulated data is divided into voice data and image data, the voice data is contrarily converted to the voice signal by the voice signal processing unit 7, and the voice signal is outputted to the telephone.

By executing the above operations in both of the transmission and reception sides, the interactive communication can be realized. In this instance, although the voice data always exists, the image data does not always exist. When no image data exists, data of all 1 is sent as image data. The voice communication during the high speed data communication is realized as mentioned above.

Figure 9:
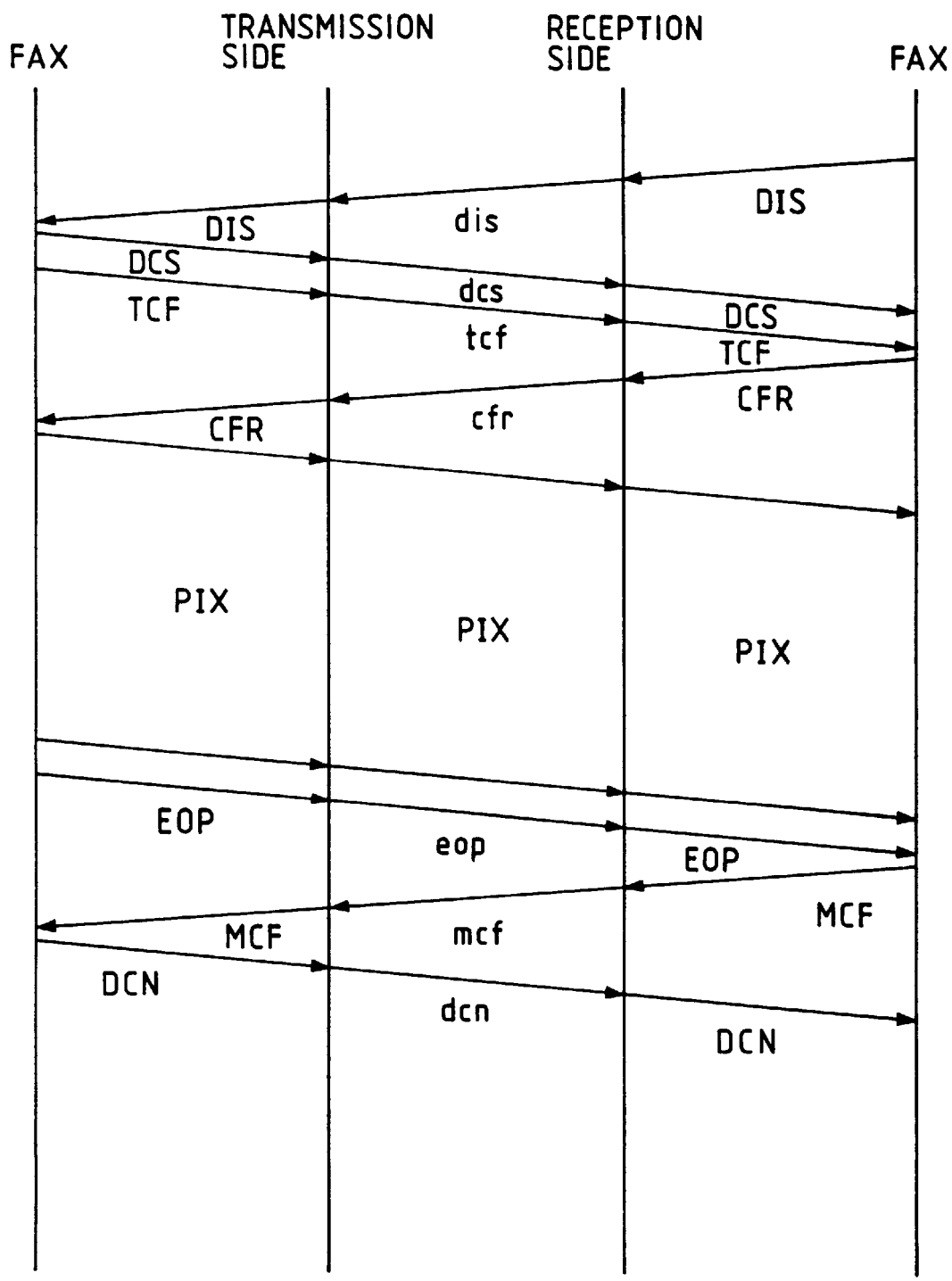
FIG. 9 is a diagram showing a protocol for a G3 mode of a facsimile apparatus which is connected to the communicating apparatus of the invention.
Figure 10B:
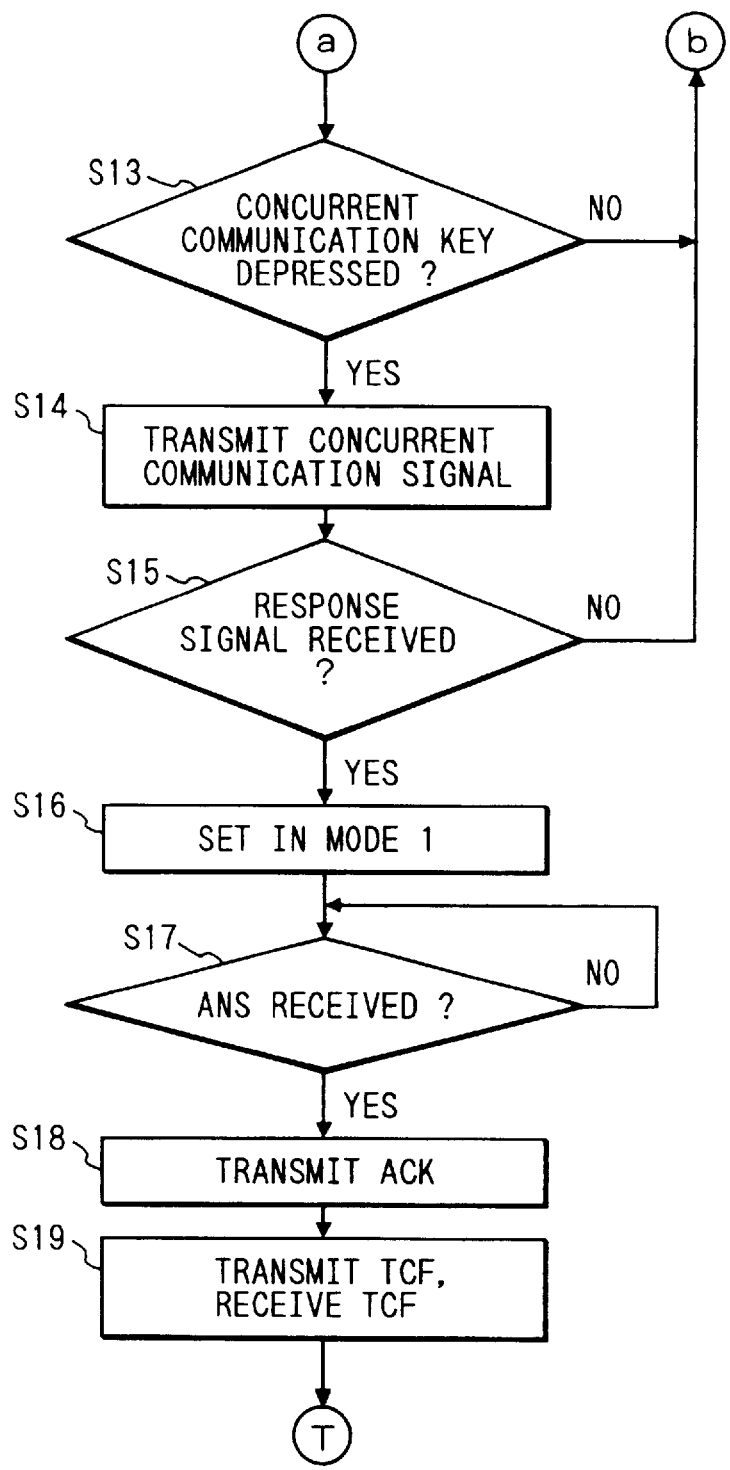
FIG. 10, consisting of FIGS. 10A and 10B, is a flowchart illustrating the operation of the communicating apparatus of the first embodiment of the invention.
Figure 11:
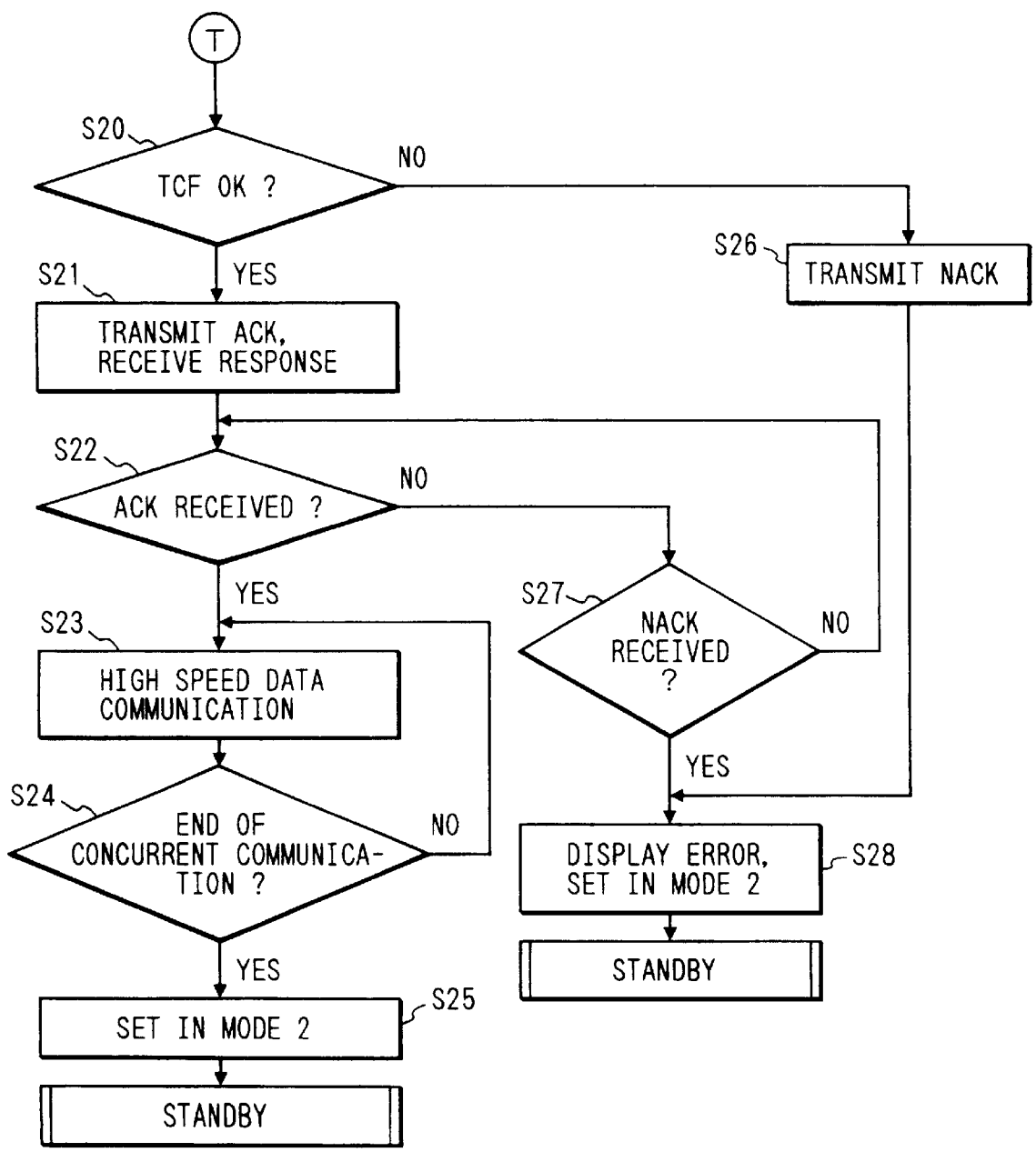
FIG. 11 is a flowchart showing the operation of the communicating apparatus of the first embodiment of the invention.
Figure 12:
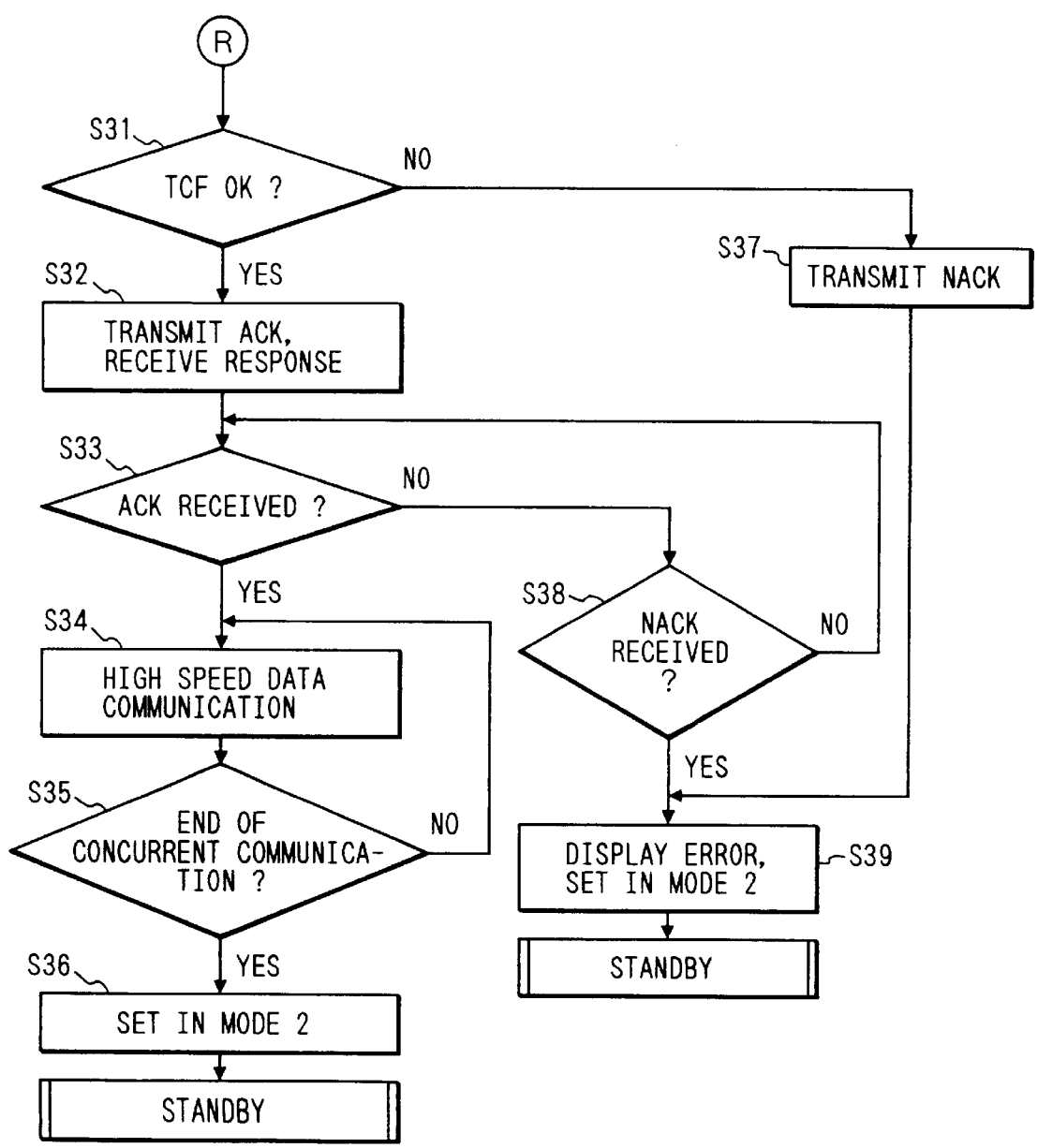
FIG. 12 is a flowchart showing the operation of the communicating apparatus of the first embodiment of the invention.

When the image communication is executed in addition to the voice communication, as shown in FIG. 9, the transmission side executes the facsimile communication of 4800 bps with the facsimile apparatus connected to the line interface unit 8 in accordance with a protocol for a G3 mode.

The reception side also executes the facsimile communication of 4800 bps with the facsimile apparatus connected in a manner similar to that on the transmission side in accordance with the protocol for the G3 mode.

According to the apparatus, as shown in FIG. 9, the transmission or reception side which received a DIS signal in the G3 mode transmits the DIS signal as image data of high speed data as shown in FIG. 6. In the boundary area between no data and image data, the format shown in FIG. 8 is used.

After that, procedure signals of the G3 mode are similarily transmitted and received. Further, the image data is also similarity transmitted and received in the format shown in FIG. 7.

Figure 13B:
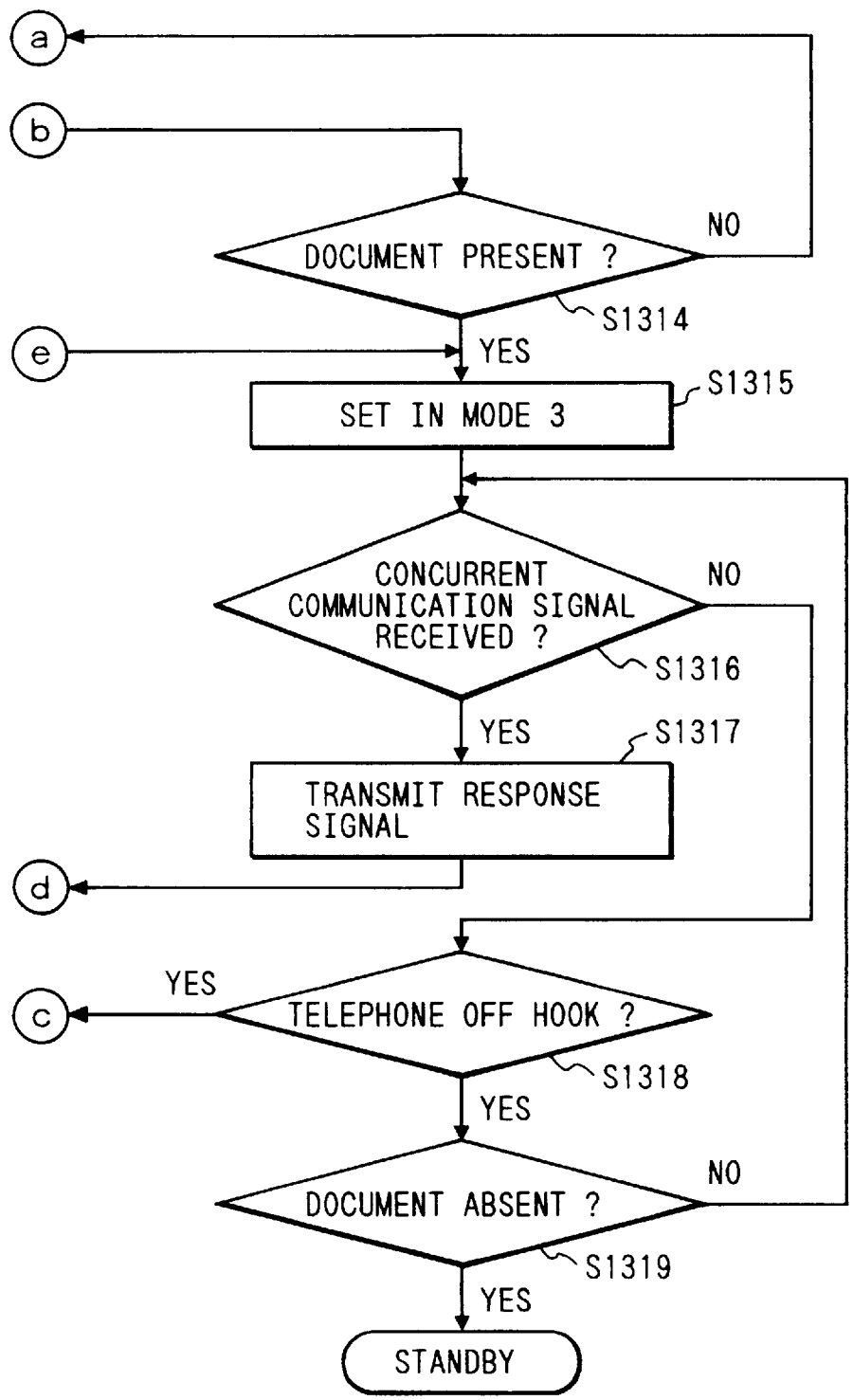
FIG. 13, consisting of FIGS. 13A and 13B is a flowchart illustrating the operation of a communicating apparatus of the second embodiment of the invention.

FIGS. 13A and 13B are flowcharts showing the operations at the time of a mode setting of the second embodiment of the invention.

In the second embodiment, since construction of the communicating apparatus and its operation are similar to those of the first embodiment, their descriptions are omitted here.

First, all of the initializing operations of the apparatus are executed in the standby state in step S1300. When the initialization is finished in step S1300, the line interface unit 8 is set in the voice mode (mode 2) in FIG. 4 in step S1301.

Mode 2 is a mode for performing the ordinary interactive communicating operation by the telephone connected to the line interface unit 8. The operation is executed as an initialization setting of the line interface unit 8.

The off-hook or on-hook state of the telephone is detected in step S1302. When the telephone is off-hooked, the presence or absence of a document in the facsimile apparatus is checked in step S1303. When the document is set in the facsimile apparatus in step S1303, a request signal of the concurrent communication of the telephone and the facsimile apparatus is transmitted to the partner side in step S1304. When the response signal for the request signal of the concurrent communication is received in step S1305, it is judged that the partner side can also perform the concurrent communication. The line interface unit 8 is set to the FAX/voice concurrent communication mode (mode 1) in step S1306. The externally attached facsimile apparatus is connected to the FAX signal processing unit 6, the externally attached telephone is connected to the voice signal processing unit 7, and concurrent communication of the facsimile apparatus and the telephone is executed. Since the data format for concurrent communication and the communicating operation of the communicating apparatus are similar to those of the first embodiment, their descriptions are omitted here.

When the off-hook state of the telephone is not detected in step S1302 and the document is set in the facsimile apparatus in step S1314, the line interface unit 8 is set to the facsimile communication mode (mode 3) in step S1315. Mode 3 is a mode for performing the ordinary communication of facsimile apparatus and the line 9 is connected to the externally attached facsimile apparatus. Since the data format and the communicating operation for facsimile communication are similar to those in the first embodiment, their descriptions are omitted here.

When the request signal of the concurrent communication is received from the partner side in step S1316, the response signal for the concurrent communication request signal is returned in step S1317, and the processing routine advances to step S1306. When the request signal of the concurrent communication is not received in step S1316, the detection of the off-hook signal from the externally attached telephone is executed in step S1318. When the off-hook state is detected, step S1304 follows. When the off-hook state is not detected, the absence or presence of the document in the externally attached facsimile apparatus is checked in step S1319. When no document is left in the facsimile apparatus, the apparatus enters the standby state.

When a absence of the document in the facsimile apparatus is detected in step S1303, the line interface unit 8 is set in the voice mode (mode 2) in step S1309, the line 9 is connected to the externally attached telephone, and voice communication is executed. When the request signal of the concurrent communication of the facsimile apparatus and the telephone is received from the partner side in step S1310, the response signal for the request signal of the concurrent communication is returned in step S1311 and S1306 follows. When the request signal of the concurrent communication is not received in step S1310, the absence or presence of the document of the externally attached facsimile apparatus is checked in step S1312. When the presence of the document is detected, step S1304 follows. When no document is set in the facsimile apparatus in step S1312 and the on-hook of the externally attached telephone is detected in step S1313, the apparatus enters the standby state.

When there is no document in the facsimile apparatus in step S1307, the end of the facsimile communication is notified to the partner which executes the communication.

When the response signal from the partner side is received, the mode is switched to the voice mode (mode 2).

When the on-hook state of the telephone is detected in step S1308, end of the interactive communication is communicated to the partner which executes the communication. When the response signal is received from the partner side, the mode is switched to the facsimile communication mode (mode 3). As a method for the notification of the facsimile communication end and the notification of the interactive communication end, the on-hook signals of the facsimile and the telephone can be sent to the partner side or the signals corresponding to the on-hook signals can be also preset and sent.

As mentioned above, according to the second embodiment, when the end of the communication of the telephone or facsimile apparatus is detected during the concurrent communication of the facsimile apparatus and voices, the mode is automatically switched to the voice mode or facsimile communication mode and the communication is executed.

When the signal of the communication start of the facsimile apparatus is detected during the communication in the voice mode, the mode is automatically switched to the FAX/voice concurrent communication mode and the concurrent communication is executed.

When the signal of the communication start of the telephone is detected during the communication in the facsimile communication mode, the mode is automatically switched to the FAX/voice concurrent communication mode and the concurrent communication is executed.

According to the embodiment, although the communicating apparatus to which the existing facsimile apparatus and telephone are connected and which can perform the concurrent communication of the facsimile apparatus and the voices has been described, the invention can be also applied to a communicating apparatus in which the facsimile apparatus and the telephone are assembled.

Although the concurrent communication of the telephone and the facsimile apparatus has been described in the first and second embodiments, according to the invention, various kinds of concurrent communications such as concurrent communication of a telephone and a computer communication, concurrent communication of the data communication and the voice communication, and concurrent communication between the data communications can be also performed. In this case, the concurrent communication can be performed by connecting a computer or other data communication terminals to the line interface unit 8 in place of the facsimile apparatus or the telephone.

Although the concurrent communication has been realized by the time-division multiplexing in the first and second embodiments, according to the invention, for instance, the concurrent communication can be also realized by another multiplexing method such as frequency multiplexing method or code multiplexing method.

Although the invention has been described above on the basis of the preferred embodiments, the present invention is not limited to the foregoing embodiments but many modifications and variations are possible within the spirit and scope of the appended claims of the invention.

What is claimed is:

1. A communication apparatus connectable to a communication line, comprising:

first communication means for performing voice communication via the communication line;

second communication means for performing data communication via the communication line;

third communication means for concurrently performing the voice communication and the data communication via the communication line;

designation means for designating any one of a voice communication mode for performing the voice communication, a data communication mode for performing the data communication, and a concurrent communication mode for concurrently performing the voice communication and the data communication; and switch means for connecting the communication line to said first communication means, said second communication means or said third communication means in accordance with the mode designated by said designation means.

2. A communication apparatus according to claim 1, further comprising instruction means for arbitrarily instructing said designation means to designate a mode.

3. A communication apparatus according to claim 1, wherein said switch means automatically performs its connection.

4. A communication apparatus according to claim 1, wherein said switch means connects the communication line to said first communication means or said second communication means, respectively, when said voice communication mode or said data communication mode is designated while said third communication means is connected to the communication line.

5. A communication apparatus according to claim 1, wherein said switch means connects the communication line to said third communication means when said concurrent communication mode is designated while the communication line is connected to said first communication means or said second communication means.

6. A communication apparatus according to claim 1, wherein the first communication means and the second communication means perform communication of an analog signal.

7. A communication apparatus according to claim 6, wherein the third communication means binarizes and multiplexes the analog signal.

8. A communication apparatus according to claim 6, wherein the third communication means performs said concurrent communication through a time division multiplexing communication.

9. A communication apparatus according to claim 1, wherein said second communication means performs a facsimile communication.

10. A communication apparatus according to claim 1, further comprising first connecting means connected to an external voice communication apparatus, wherein said first communication means performs the voice communication of said external voice communication apparatus connected to said first connecting means.

11. A communication apparatus according to claim 1, further comprising second connecting means connected to an external data communication apparatus, wherein said second communication means performs the data communication of said external data communication apparatus connected to said second connecting means.

12. A communication apparatus according to claim 1, wherein said communication apparatus is connected to an external voice communication apparatus and an external data communication apparatus, and said third communication means concurrently performs the voice communication of said external voice communication apparatus and the data communication of said external data communication apparatus.

13. A communication apparatus according to claim 1, further comprising determining means for determining whether the concurrent communication by said third communication means is possible when said concurrent communication mode is set by said setting means, wherein said setting means sets said voice communication mode or said data communication mode when said determining means determines that the concurrent communication is not possible.

14. A communication apparatus connectable to a communication line, comprising:

first communication means for performing voice communication via the communication line;

second communication means for performing data communication via the communication line;

third communication means for performing the voice communication and the data communication as concurrent communication via the communication line;

first switch means for selectively connecting the communication line to said first communication means;

second switch means for selectively connecting the communication line to said second communication means;

third switch means for selectively connecting the communication line to said third communication means; and control means for performing the voice communication by said first communication means, the data communication by said second communication or the concurrent communication by said third communication means in accordance with switching operations of said first switch means, said second switch means and said third switch means.

15. A communication apparatus according to claim 14, further comprising instruction means for arbitrarily instructing the switching operations of said first switch means, said second switch means and said third switch means.

16. A communication apparatus according to claim 14, wherein the switching operations of said first switch means, said second switch means or said third switch means are automatically performed.

17. A communication apparatus according to claim 14, wherein when a predetermined signal is input while said third communication means is connected to the communication line by said third switch means, said first switch means or said second switch means connects said first communication means or said second communication means to the communication line in response to the predetermined signal.

18. A communication apparatus according to claim 14, wherein said third switch means connects said third communication means to the communication line when a predetermined signal is input while said first communication means is connected to the communication line by said first switch means or said second communication means is connected to the communication line by said second switch means.

19. A communication method of a communication apparatus connectable to a communication line, the apparatus comprising first communication means for performing voice communication, second communication means for performing data communication, and third communication means for performing the voice communication and the data communication as concurrent communication, said method comprising the steps of:

setting a voice communication mode for performing the voice communication, a data communication mode for performing the data communication, or a concurrent communication mode for concurrently performing the voice communication and the data communication; and controlling switch means for connecting the communication line to the first communication means, the second communication means or the third communication means, in accordance with the mode set in said setting step.

20. A communication method according to claim 19, further comprising the step of arbitrarily instructing said controlling step to set a mode.

21. A communication method according to claim 19, wherein said controlling step is automatically performed.

22. A communication method according to claim 19, wherein said controlling step controls the communication line so as to be connected to the first communication means or the second communication means by the switch means when said voice communication mode or said data communication mode is set in said setting step while the communication line is connected to the third communication means by the switch means.

23. A communication method according to claim 19, wherein said controlling step controls the communication line so as to be connected to the third communication means by the switch means when said concurrent communication mode is set in said setting step while the communication line is connected to the first communication means or the second communication means by the switch means.

24. A communication method according to claim 19, wherein said first communication means and said second communication means perform communication of an analog signal.

25. A communication apparatus according to claim 24, wherein said third communication means binarizes and multiplexes the analog signal.

26. A communication apparatus according to claim 24, wherein said third communication means performs said concurrent communication through a time division multiplexing communication.

27. A communication apparatus according to claim 19, wherein said second communication means performs a facsimile communication.

28. A communication method according to claim 19, wherein said communication apparatus is connected to an external voice communication apparatus, and said first communication means performs the voice communication of said external voice communication apparatus.

29. A communication method according to claim 19, wherein said communication apparatus is connected to an external data communication apparatus, and said second communication means performs the data communication of said external data communication apparatus.

30. A communication apparatus according to claim 19, wherein said communication apparatus is connected to an external voice communication apparatus and an external data communication apparatus, and said third communication means concurrently performs the voice communication of external voice communication apparatus and the data communication of said external data communication apparatus.

31. A communication method according to claim 19, further comprising the step of determining whether the concurrent communication by said third communication means is possible when said concurrent communication mode is set in said setting step, wherein said setting step sets said voice communication mode or said data communication mode when said determining step determines that the concurrent communication is not possible.

32. A communication method of a communication apparatus connectable to a communication line, the apparatus comprising first communication means for performing voice communication, second communication means for performing data communication, and third communication means for performing the voice communication and the data communication as concurrent communication, said method comprising:

a first switching step of selectively connecting the communication line to the first communication means;

a second switching step of selectively connecting the communication line to the second communication means; and a third switching step of selectively connecting the communication line to the third communication means, wherein the voice communication by the first communication means, the data communication by the second communication means or the concurrent communication by the third communication means is performed in accordance with switching operations in said first switching step, said second switching step, and said third switching step.

33. A communication method according to claim 32, further comprising the step of arbitrarily instructing the switching operations in said first switching step, said second switching step and said third switching step.

34. A communication method according to claim 32, wherein the switching operations in said first switching step, said second switching step and said third switching step are automatically performed.

35. A communication method according to claim 32, wherein when a predetermined signal is input while the third communication means is connected to the communication line by the third switching step, the communication line is connected to the first or second communication means is performed.

36. A communication method according to claim 32, wherein when a predetermined signal is input while the first or second communication means is connected to the communication line, the third communication means is connected to the communication line by said third switching step.

37. A communication method according to claim 32, wherein the third communication means performs a time division multiplexing communication.

38. A communication apparatus connectable to a communication line, comprising:

first connecting means for connecting to an external voice apparatus;

second connecting means for connecting to an external data communication apparatus;

multiplexing means for multiplexing a voice signal from the external voice communication apparatus connected to said first connecting means with a data signal from the external data apparatus connected to said second connecting means;

first switch means for connecting the external voice communication apparatus to the communication line in performing the voice communication and for connecting the external voice communication apparatus to said multiplexing means in performing multiplexing communication of the voice communication and the data communication;

second switch means for connecting the external data communication apparatus to the communication line in performing the data communication and for connecting the external data communication apparatus to said multiplexing means in performing multiplexing communication of the voice signal and the data signal; and third switch means for connecting said multiplexing means to the communication line in performing multiplexing communication of the voice signal and the data signal.

39. A communication apparatus according to claim 38, further comprising instruction means for arbitrarily instructing switching operations of said first switch means, said second switch means and said third switch means.

40. A communication apparatus according to claim 39, wherein the switching operations of said first switch means, said second switch means and said third switch means are automatically performed.

41. A communication method of a communication apparatus connectable to a communication line, an external voice communication apparatus and an external data communication apparatus, the apparatus comprising multiplexing means for multiplexing a voice signal from the voice communication apparatus with a data signal from the external data communication apparatus, said method comprising:

a first switching step of connecting the external voice communication apparatus to the communication line in performing the voice communication and for connecting the external voice communication apparatus to the multiplexing means in performing multiplexing communication of the voice signal and the data signal;

a second switching step of connecting the external data communication apparatus to the communication line in performing the data communication and for connecting the external voice communication apparatus to the multiplexing means in performing multiplexing communication of the voice signal and the data signal; and a third switching step of connecting the multiplexing means to the communication line in performing multiplexing communication of the voice signal and the data signal.

42. A communication method according to claim 41, further comprising the step of arbitrarily instructing switching operations in said first switching step, said second switching step and said third switching step.

43. A communication method according to claim 41, wherein the switching operations in said first switching step, said second switching step and said third switching step are automatically performed.

* * * * *

UNITED STATES PATENT AND TRADEMARK OFFICE
CERTIFICATE OF CORRECTION

PATENT NO. : 5,854,830

DATED : December 29, 1998

INVENTOR(S) : TOSHIO KENMOCHI

It is certified that error appears in the above-identified patent and that said Letters Patent is hereby corrected as shown below:

<u>COLUMN 9</u>

Line 7, "set by said setting" should read
       --designated by said designation--.
    Line 8, "setting means sets" should read
       --designation means designates--.

<u>COLUMN 10</u>

Line 34, "apparatus" should read --method--.
    Line 37, "apparatus" should read --method--.
    Line 41, "apparatus" should read --method--.
    Line 57, "apparatus" should read --method--.

UNITED STATES PATENT AND TRADEMARK OFFICE
CERTIFICATE OF CORRECTION

PATENT NO. : 5,854,830

DATED : December 29, 1998

INVENTOR(S) : TOSHIO KENMOCHI

It is certified that error appears in the above-identified patent and that said Letters Patent is hereby corrected as shown below:

COLUMN 11

Line 42, "is performed" should be deleted.

Signed and Sealed this

Thirtieth Day of November, 1999

Attest:

Q. TODD DICKINSON

*Attesting Officer*   *Acting Commissioner of Patents and Trademarks*